United States Patent [19]

Nakai et al.

[11] Patent Number: 4,595,728
[45] Date of Patent: Jun. 17, 1986

[54] IMPACT-RESISTANT METHACRYLIC RESIN COMPOSITION

[75] Inventors: Yoshio Nakai, Iwakuni; Masamitsu Tateyama, Yamaguchi, both of Japan

[73] Assignee: Mitsubishi Rayon Company, Ltd., Tokyo, Japan

[21] Appl. No.: 667,345

[22] Filed: Nov. 1, 1984

[30] Foreign Application Priority Data

Nov. 2, 1983 [JP] Japan .................. 58-204896

[51] Int. Cl.$^4$ .................. C08L 31/06; C08L 33/04; C08F 265/04
[52] U.S. Cl. ........................ 525/81; 525/306
[58] Field of Search .................. 525/81, 306

[56] References Cited

U.S. PATENT DOCUMENTS 3,843,753 10/1974 Owens .................. 525/81
3,966,846 6/1976 Gutmann et al. .................. 525/306

Primary Examiner—Edward J. Smith
Attorney, Agent, or Firm—Cushman, Darby & Cushman

[57] ABSTRACT

Disclosed is an impact-resistant methacrylic resin composition which comprises a graft copolymer [II] obtained by polymerizing 10 to 900 wt. parts of a monomer or monomeric mixture (B) comprising 80 to 100 wt. % methyl methacrylate and 20 to 0 wt. % of at least one vinyl or vinylidene monomer copolymerizable therewith in the presence of 100 wt. parts of an acrylic elastomer [I] obtained by polymerizing monomeric mixture (A) comprising 9.9 to 29.9 wt. % of styrene and/or its derivative, 70 to 90 wt. % of at least one alkyl (C2-8) acrylate, 0.1 to 5 wt. % of at least one monomer represented by the formula:

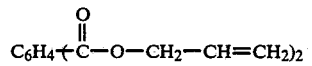

and 0 to 5 wt. % of a crosslinkable copolymerizable monomer having at least 2 carbon-to-carbon double bonds. This graft copolymer [II] may be used in combination with a methacrylic resin [III] obtained by polymerizing a monomer or monomeric mixture (C) comprising 80 to 100 wt. % methyl methacrylate and 20 to 0 wt. % of at least one copolymerizable vinyl or vinylidene monomer. The impact-resistant resin composition has excellent transparency and weatherability and a good surface gloss.

9 Claims, No Drawings

IMPACT-RESISTANT METHACRYLIC RESIN COMPOSITION

BACKGROUND OF THE INVENTION (1) Field of the Invention

This invention relates to an impact-resistant methacrylic resin which has excellent transparency and weatherability as well as good surface gloss. More specifically, it relates to an impact-resistant methacrylic resin having a good surface gloss, which comprises a methacrylic resin and, incorporated therein, a graft copolymer obtained by graft-polymerizing a monomer composed mainly of methyl methacrylate to an acrylic elastomer composed mainly of an acrylic acid ester, which has been crosslinked with a substance having a special structure.

(2) Description of the Prior Art

Among plastic materials, a methacrylic resin has excellent transparency and optical characteristics and also an excellent surface gloss, weatherability, dye or pigment colorability, and moldability. Accordingly, this resin is widely used for illumination articles, signboards, window materials, optical lenses, vehicle parts, and display devices. However, this methacrylic resin is defective in that the impact resistance is poor, and thus, improvement of the impact resistance is strongly desired in the respective fields in which the resin is used. Various methods for imparting a good impact resistance to a methacrylic resin have been proposed. However, an impact-resistant methacrylic resin which retains excellent inherent characteristics such as high transparency, good appearance, high weatherability, and good moldability has not been developed.

According to most of these known methods, an elastomer which is rubbery at normal temperature is dispersed in a methacrylic resin. As the rubbery elastomer, there have been used an unsaturated rubber elastomer composed mainly of butadiene, and a saturated rubbery elastomer such as an acrylic acid ester copolymer composed mainly of butyl acrylate or 2-ethyl-hexyl acrylate, or an ethylene/vinyl acetate copolymer.

The incorporation of an unsaturated rubber elastomer in a methacrylic resin results in the manifestation of a high impact resistance, but the weatherability is degraded by the unsaturated bonds present in the main chain of the polymer. A good weatherability is attained by the incorporation of a saturated rubbery elastomer, but since the modulus of elasticity and elastic recovery of the saturated rubbery elastomer per se are low and the elastomer has a poor graft-polymerizability with a hard resin component, the impact resistance, transparency, and surface gloss are poor. Further, the surface appearance is not satisfactory because of flow marks.

Important factors in preparing a two-component type impact-resistant resin comprising a discontinuous phase of particles of a rubbery elastomer homogeneously dispersed in a continuous phase of a hard resin such as a methacrylic resin are the particle size and crosslinking degree of the rubbery elastomer, the graft-polymerizability of the hard resin phase to the rubber phase, and the molecular weight of the hard resin. In fact, the relative superiority and balance of the resin characteristics of the final resin composition are greatly influenced by these factors.

More specifically, where the particle size of the rubbery elastomer is small, the transparency is high but the impact resistance is degraded, and where the crosslinking degree of the elastomer is high, the surface gloss of the final resin composition is good but the impact resistance is poor.

Similarly, the degree of the graft-polymerization of the hard resin phase to the rubbery elastomer has a large influence on the compatibility of the rubbery elastomer with the continuous resin phase and the dispersibility of the rubbery elastomer in the continuous resin phase, and also on the impact resistance, transparency, stress-whitening resistance, surface gloss, and flow processability. When a saturated rubbery elastomer is used, the graft-polymerizability is ordinarily low, and special care should be taken. As the molecular weight of the hard resin is high, the impact resistance is effectively improved but the moldability and surface appearance of the final composition are degraded.

As a means for enhancing the compatibility of the rubbery elastomer with the hard resin component, a method has been proposed in which a methyl methacrylate monomer mixture containing an acrylic acid ester is polymerized in multiple stages in the presence of an alkyl acrylate polymer elastomer (see U.S. Pat. No. 3,562,235). However, this method includes at least four stages and is very complicated.

The present inventors previously proposed a method in which by polymerizing a mixture of an acrylic ester monomer with alkyl acrylate or methacrylate in preparing an acrylic acid ester polymer elastomer by polymerization, the compatibility of the elastomer with the hard resin comprising methyl methacrylate units as the main structural units is increased and an impact-resistant methacrylic resin having an excellent transparency and weatherability is obtained (see Japanese Examined Patent Publication No. 54-18298).

In this method the above-mentioned compatibility is improved and a transparent impact-resistant methacylic resin having an excellent weatherability can be obtained. However, the resin composition obtained according to this method tends to be influenced by the molding condition, in particular the surface gloss of a molded article of this resin composition is readily influenced by the molding conditions.

SUMMARY OF THE INVENTION

The primary object of the present invention is to eliminate the above-mentioned defects and provide a methacrylic resin composition which is influenced by the molding conditions only to a very slight extent and which has excellent impact resistance as well as good inherent characteristics of a methacrylic resin such as high transparency, good surface appearance, high weatherability, and good flow processability.

In one aspect of the present invention, there is provided an impact-resistant methacrylic resin composition which comprises a graft copolymer [II] obtained by polymerizing 10 to 900 parts by weight of a monomer or monomeric mixture (B) comprising 80 to 100% by weight of methyl methacrylate and 20 to 0% by weight of at least one vinyl or vinylidene monomer copolymerizable therewith in the present of 100 parts by weight of an acrylic elastomer [I] obtained by polymerizing a monomeric mixture (A) comprising 9.9 to 29.9% by weight of at least one monomer selected from the group consisting of styrene and vinyltoluene, 70 to 90% by weight of at least one alkyl ester of acrylic acid having an alkyl group having 2 to 8 carbon atoms, 0.1 to 5% by weight of at least one monomer selected from the group consisting of compounds represented by the following formula:

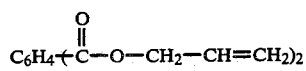

and 0 to 5% by weight of a crosslinkable monomer copolymerizable with the foregoing monomers, which has at least 2 carbon-to-carbon double bonds.

In another aspect of the present invention, there is provided an impact-resistant methacrylic resin composition which comprises the above-mentioned graft copolymer [II] and a methacrylic resin [III] obtained by polymerizing a monomer or monomeric mixture (C) comprising 80 to 100% by weight of methyl methacrylate and 20 to 0% by weight of at least one vinyl or vinylidene monomer copolymerizable therewith; the amount of the graft copolymer [II] being such that the proportion of the acrylic elastomer [I] in the graft copolymer [II] to the total of the graft copolymer [II] and the methacrylic resion [III] is in the range of 0.5 to 70% by weight.

DETAILED DESCRIPTION OF THE PREFERRED EMBODIMENTS

To ensure a good transparency, it is preferred that the monomer composition of the hard resin phase (B) [i.e., the above-mentioned monomer or monomeric mixture B] and the monomer composition of the above-mentioned methacrylic resin [III] used for blending be the same as or very similar to each other except the additions and crosslinkable monomer to be added to the respective components at the polymerization stages. It also is preferred that the refractive index of the above-mentioned acrylic elastomer [I] be very close to those of the hard resin phase (B) and the methacrylic resin [III].

To attain a good balance among the transparency, surface appearance and impact resistant-manifesting effect in the resin composition obtained by dispersing rubber particles in the continuous resin phase, the particle size of the rubber particles to be dispersed should be taken into consideration. Thus, it is preferred that the acrylic elastomer [I] has a particle size of 0.03 to 0.25 μm, more preferably 0.05 to 0.15 μm, at the time the polymerization for the acrylic elastomer is completed.

The acrylic elastomer [I] used in the present invention is a copolymer comprising 70 to 90% by weight of at least one alkyl acrylate selected from alkyl esters of acrylic acid having an alkyl group having 2 to 8 carbon atoms, preferably n-butyl acrylate and 2-ethylhexyl acrylate; 9.9 to 29.9% by weight of at least one monomer selected from styrene and its derivatives, preferably styrene or its mixture with a derivative thereof; 0.1 to 5% by weight of at least one monomer selected from compounds represented by the following formula:

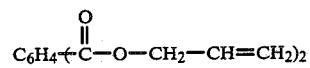

preferably diallyl isophthalate or diallyl terephthalate; and 0 to 5% by weight of a crosslinkable monomer copolymerizable with the foregoing monomers, which has at least 2 carbon-to-carbon double bonds.

The mixing ratio of the alkyl acrylate monomer to styrene or its derivative is an important factor toward imparting a good transparency. If the mixing ratio is outside the above-mentioned range, the transparency is reduced. The styrene derivative to be copolymerized with the alkyl acrylate includes, for example, vinyltoluene, α-methylstryrene and chlorostyrene.

The compound represented by the above formula is an important component in the composition of the present invention, and the object of the present invention is attained by the presence of this substance. The mechanism of the functional effect of this substance has not been completely elucidated, but it is presumed that the crosslinking degree of the crosslinked acrylic elastomer [I] and the graft-polymerizability of the acrylic elastomer [I] with a methyl methacrylate monomer are controlled in a good balance by the above compound. The appropriate amount of the compound added varies, depending upon whether it is used alone or in combination, but it is ordinarily added in an amount of 0.1 to 5% by weight. In addition to the compound represented by the above general formula, a known polyfunctional monomer may be used in an amount of up to 5% by weight. The kind of the polyfunctional monomer used is not particularly critical, and may include monomers customarily used in this field. More specifically, there may be used ethylene glycol diacrylate, ethylene glycol dimethacrylate, 1,3-butylene diacrylate, 1,3-butylene dimethacrylate, 1,4-butanediol diacrylate, 1,4-butanediol dimethacrylate, tetraethylene glycol diacrylate, tetraethylene glycol dimethacrylate, and divinylbenzene.

The graft copolymer [II] used in the present invention is obtained by polymerizing the monomer or monomeric mixture (B) in the presence of the acrylic elastomer [I]. This monomer or monomeric mixture (B) comprises 80 to 100% by weight of methyl methacrylate, and 0 to 20% by weight of at least one vinyl or vinylidene monomer copolymerizable therewith, preferably at least one alkyl acrylate having an alkyl group having 1 to 8 carbon atoms or a mixture of such alkyl acrylate with other vinyl or vinylidene monomer copolymerizable with the foregoing monomers.

If the content of methyl methacrylate in the monomer or monomeric mixture is smaller than 80% by weight, such characteristics as transparency and heat resistance become unsatisfactory. As the alkyl acrylate to be copolymerized with methyl methacrylate, there can be mentioned methyl acrylate, ethyl acrylate, and butyl acrylate. As the other vinyl monomer to be used as the comonomer, there can be mentioned styrene, acrylonitrile and methacrylic acid. If the content of the alkyl acrylate and other vinyl or vinylidene monomer in the monomeric mixture (B) exceeds 20% by weight, the heat resistance and transparency of the final composition become unsatisfactory.

It is indispensable that the monomer or monomeric mixture (B) be polymerized in an amount of 10 to 900 parts by weight per 100 parts by weight of the acrylic elastomer [I]. If the amount of the monomer or monomeric mixture (B) is smaller than 10 parts by weight, the impact resistance-manifesting effect is insufficient or the surface gloss is degraded. If the amount of the monomer or monomeric mixture (B) exceeds 900 parts by weight, the productivity is lowered.

To adjust the molecular weight, a polymerization regulator such as mercaptan may be added to the monomer or monomeric mixture (B) according to need. As the polymerization regulator, alkylmercaptans, thioglycolic acid and its esters, β-mercaptopropionic acid and its esters, and aromatic mercaptans such as thiophenol and thiocresol can be used.

The first aspect of the present invention is directed to a composition comprising the above-mentioned graft copolymer [II], and the second aspect of the present invention is directed to a composition formed by incorporating the above graft copolymer [II] with a methacrylic resin [III] described below.

The methacrylic resin [III] is a polymer comprising 80 to 100% by weight of methyl methacrylate and 0 to 20% by weight of an other vinyl or vinylidene monomer, for example, an acrylic acid ester having an alkyl group having 1 to 4 carbon atoms. The composition according to the second aspect of the present invention is formed by incorporating the above-mentioned graft copolymer [II] with the methacrylic resin [III]. The amount of the graft copolymer [II] is such that the proportion of the acrylic elastomer [I] in the graft copolymer [II] to the total of the graft copolymer [II] and the methacrylic resin [III] is in the range of 0.5 to 70% by weight.

The methacrylic resin composition having a multilayer structure according to the present invention is preferably prepared according to an emulsion polymerization process. Therefore, an embodiment of the process of the present invention according to the emulsion polymerization will now be described.

A reaction vessel is charged with deionized water and, if necessary, an emulsifier, the monomers for the acrylic elastomer [I] are polymerized, and then the monomer or monomeric mixture (B) is polymerized.

The polymerization temperature is 30° C. to 120° C. and preferably 50° C. to 100° C. The polymerization time varies, depending upon the kinds and amounts of the polymerization initiator and emulsifier and the polymerization temperature, but ordinarily, the polymerization time at each of the polymerization stages (A) and (B) is 0.5 to 7 hours.

It is preferred that the ratio of the polymer to water be such that the ratio of the monomers to water is in the range of from 1/20 to 1/1. The polymerization initiator and emulsifier may be added to one or both of the aqueous monomer phases.

At the polymerization stages (A) and (B), the monomers may be charged collectively or dividedly, but the divided charging method is preferred in view of generation of the polymerization heat.

Emulsifiers customarily used in this field may be used without any limitation. For example, long chain fatty acid salts, sulfosuccinic acid alkyl ester salts, and alkylbenzene-sulfonic acid salts may be used.

The kind of polymerization initiator used is not particularly critical, and may include water-soluble inorganic initiators customarily used in this field, such as persulfates and perborates. Furthermore, these initiators may be combined with sulfites or thiosulfates and be used as redox type initiators. Moreover, redox initiators such as organic hydroperoxide-ferrous salt and organic hydroperoxide-sodium sulfoxylate, and initiators such as benzoyl peroxide and azobisisobutyronitrile can be used.

The polymer latex obtained by the emulsion polymerization is coagulated and dried according to known procedures.

It is preferred that the obtained graft copolymer [II] is incorporated and dispersed in the methacrylic resin [III] by a melt-mixing method. If necessary, auxiliary components such as a stabilizer, a lubricant, a plasticizer, a dye, a pigment, and a filler may be added before melt-mixing. The blend is mixed by a twin-shell blender or a Henschel mixer and is melt-kneaded by using a mixing roll or a screw type extruder at 150° C. to 300° C.

When the thus-obtained composition is shaped by using an extruder or an injection molding machine, shaped articles having a high impact resistance and excellent transparency and surface gloss can be obtained.

As is apparent from the foregoing description, the methacrylic resin composition of the present invention is influenced only to a very slight extent by the molding conditions and has a high impact resistance, and inherent characteristics of a methacrylic resin such as high transparency, good surface appearance, high weatherability, and flow processability are not degraded at all.

The present invention will now be described in detail with reference to the following examples. In the examples, all of "parts" and "%" are by weight.

EXAMPLE 1

(1) Preparation of Acrylic Elastomer [I]

A stainless steel reaction vessel having an inner volume of 100 l was first charged with composition (A) comprising the ingredients shown below. Nitrogen was blown into the reaction vessel to produce a state wherein there was no substantial influence of oxygen. The temperature was then elevated to 75° C. and composition (B) described below was added, and polymerization was carried out for 90 minutes. Then, 5.6 kg of a monomeric composition having the same composition as that of composition (A)-2 was continuously added to the reaction mixture over a period of 130 minutes and polymerization was further conducted for 150 minutes.

| Composition (A) | | |
|---|---|---|
| (A)-1 | | |
| Deionized water | | 57.5 kg |
| Sarcosinate LN*[1] (S-LN) | | 100 g |
| Boric acid | | 100 g |
| Sodium carbonate | | 10 g |
| (A)-2 | | |
| Butyl acrylate (BA) | 78.3% | |
| Styrene (ST) | 19.4% | |
| Diallyl isophthalate (MDAP) | 1.3% | |
| 1,4-Butanediol diacrylate (C$_4$DA) | 0.5% | 2.4 kg |
| Cumene hydroperoxide (CHP) | 0.5% | |
| Composition (B) | | |
| Deionized water | | 500 g |
| Rongalit | | 40 g |

*[1]: product supplied by Nikko Chemicals K.K.

The conversion of butyl acrylate was 97% and the conversion of styrene was 99%, and the particle size of the obtained latex was 0.07 μm.

(2) Preparation of Graft Copolymer [II] by Polymerization of Monomeric Mixture (B)

In the same reaction vessel containing the acrylic elastomer [I] obtained in (1) above, 500 g of deionized water and a further 75 g of S-LN were charged and the temperature was elevated to 80° C. Then, the following monomeric mixture (B) was continuously added over a period of 300 minutes to effect polymerization. The polymerization was further conducted for 60 minutes to obtain a graft copolymer [II] in the form of a latex. Each of the conversions of methyl methacrylate and ethyl acrylate in the monomeric mixture was higher than 99.5%.

Test piece size: 110 mm×110 mm×2 mm (thickness) and 70 mm×12.5 mm×6.2 mm (thickness).

TABLE 1

| | Molding Conditions | | | | Total | Melt Flow | | |
|---|---|---|---|---|---|---|---|---|
| | Cylinder Temperature (°C.) | Mold Temperature (°C.) | Gloss (%)[1] (incident angle of 60°) | Haze (%)[2] | Luminous Transmittance[3] (%) | Index[4] (g/10 min) (230° C., 10 kg) | Izod Impact Strength[5] (kg-cm/cm) | Defects on Surface of Molded Plate |
| Example 1 | 235 | 50 | 99.3 | 1.7 | 92.3 | 4.3 | 5.0 | None |
| | 245 | 60 | 99.5 | 1.7 | 92.1 | — | 5.1 | None |
| | 255 | 70 | 99.8 | 1.7 | 92.3 | — | 5.1 | None |

Note
[1]: ASTM D-673-44,
[2]: ASTM D-1003-52,
[3]: ASTM D-1003-52,
[4]: ASTM D-1238-52T,
[5]: ASTM-D-256-54T

| Monomeric Mixture (B) | | |
|---|---|---|
| Methyl mechacrylate (MMA) | 94.35% | |
| Ethyl acrylate (EA) | 5% | 24 kg |
| N—octylmercaptan ($C_8$—SH) | 0.35% | |
| Cumene hydroperoxide (CHP) | 0.3% | |

The latex was coagulated, washed and dried according to the following procedures to obtain a powder of the graft copolymer [II].

A stainless steel vessel was charged with 140 kg of 2% aqueous sulfuric acid and the temperature was elevated to 80° C. with stirring. Then, 70 kg of the latex prepared above was continuously added over a period of 20 minutes. The inner temperature was elevated to 95° C. and this temperature was maintained for 5 minutes. The mixture was cooled to room temperature, and the precipitated polymer was recovered by filtration and washed with deionized water to obtain a white creamy polymer. The polymer was dried at 70° C. for 24 hours to obtain a white powdery polymer.

The powder was melt-kneaded and pelletized by using a screw-type extruder having an outer diameter of 40 mm (Model P-40-26AB-V supplied by K.K. Nihon Seikosho, L/D=26) at a cylinder temperature of 200° C. to 260° C. and a die temperature of 250° C. to obtain an impact-resistant methacrylic resin composition having an acrylic elastomer [I] content of 25%.

The impact-resistant methacrylic resin composition was injection-molded under the following conditions and the obtained test pieces were evaluated. The detailed results are shown in Table 1.

Injection molding machine: screw type automatic injection molding machine, Model V-17-65 supplied by K.K. Nihon Seikosho.

Injection molding conditions: cylinder and mold temperature variable, injection pressure of 700 kg/cm².

EXAMPLE 2 THROUGH 5 AND COMPARATIVE EXAMPLES 1 AND 2

(1) Preparation of Acrylic Elastomer [I]

A stainless steel reaction vessel having an inner volume of 50 l was charged with the following composition (A) and monomeric components shown in Table 2 in indicated amounts. Nitrogen was blown into the reaction vessel with stirring to produce a state wherein there is no substantial influence of oxygen. The temperature was then elevated to 65° C. and the following composition (B) was added, the temperature was elevated to 80° C., and polymerization was conducted for 90 minutes. Then, 5 kg (50 parts) of a monomeric component having the same composition as shown in Table 2 was continuously added over a period of 90 minutes, and polymerization was further conducted for 120 minutes to obtain a latex of an acrylic elastomer [I].

| Composition (A) | |
|---|---|
| Deionized water | 30 kg |
| Sarcosinate LN(S-LN) | 100 g |
| Boric acid | 100 g |
| Sodium carbonate | 10 g |
| Composition (B) | |
| Deionized water | 500 g |
| Rongalit | 50 g |

TABLE 2

| | Composition (%) of Monomeric Mixture for Acrylic Elastomer [I] | | | | | | | | Amount | |
|---|---|---|---|---|---|---|---|---|---|---|
| | Butyl acrylate (BA) | Styrene (ST) | Diallyl isophthalate (MDAP) | Diallyl terephthalate (DATP) | 1,3-Butylene dimethacrylate (BDMA) | Diallyl phthalate (DAP) | Allyl acrylate (AA) | Cumene hydroperoxide (CHP) | (kg) | [parts] |
| Example 2 | 79 | 19 | 2.0 | — | — | — | — | 0.5 | (5) | [50] |
| Example 3 | " | " | 1.5 | — | 0.5 | — | — | " | (5) | [50] |
| Example 4 | " | " | — | 2.0 | — | — | — | " | (5) | [50] |
| Example 5 | " | " | — | — | — | 2.0 | — | " | (5) | [50] |
| Comparative Example 1 | " | " | — | — | 2.0 | — | — | " | (5) | [50] |
| Comparative Example 2 | " | " | — | — | — | — | 2.0 | " | (5) | [50] |

In the polymerization of Example 2, the conversion of butyl acrylate was 98%, the conversion of styrene was 99%, and the particle size of the obtained latex was 0.08 μm.

(2) Preparation of Graft Copolymer [II] by Polymerization of Monomeric Mixture (B)

The reaction vessel containing 10 kg (100 parts) of the acrylic elastomer [I] obtained in (1) above was charged with 500 g of deionized water and a further 25 g of Sarcosinate LN (S-LN), and the mixture was stirred. Then, while the temperature was maintained at 80° C., the following monomeric mixture (B) was continuously added at a rate of 40 parts per hour. Polymerization was further conducted for 1 hour to obtain a latex of a graft copolymer [II]. The conversion of the monomeric mixture (B) was larger than 99.5%.

| Monomeric Mixture (B) | | |
|---|---|---|
| Methyl methacrylate (MMA) | 96.4% | |
| Ethyl acrylate (EA) | 3% | 8 kg |
| N—octylmercaptan | 0.3% | (80 parts) |
| Cumene hydroperoxide | 0.3% | |

The latex was coagulated, washed and dried according to the following procedures to obtain a powder of the graft copolymer [II].

A stainless steel vessel was charged with 50 kg of 1.0% aqueous sulfuric acid, and the temperature was elevated to 85° C. with stirring and 25 kg of the latex prepared above was continuously added over a period of 15 minutes. The inner temperature was then elevated to 90° C. and this temperature was maintained for 5 minutes. The mixture was cooled to room temperature, and the precipitated polymer was recovered by filtration and washed with deionized water to obtain a white creamy polymer. The polymer was dried at 70° C. for 36 hours to obtain a white powdery polymer.

Then, 10 kg of the powdery graft copolymer [II] obtained in (2) above was mixed with 12.2 kg of an acrylic resin [III] (Acrypet VH supplied by Mitsubishi Rayon Co.) and 60 g of triphenyl phosphite by a Henschel mixer, and the composition was extruded at a cylinder temperature of 200° C. to 270° C. and a die temperature of 260° C. by using the same screw type extruder as used in Example 1. The obtained pellets were injection-molded in the same manner as in Example 1 except that the cylinder and mold temperatures were varied as shown in Table 3. The obtained test pieces were evaluated, and the obtained results are shown in Table 3.

TABLE 3

| | Molding Conditions | | Gloss (%)[*1] (incident angle of 60°) | Haze[*2] (%) | Total Luminous Transmittance[*3] (%) | Melt Flow Index[*4] (g/10 min) (230° C. × 10 kg) | Izod Impact Strength[*5] (kg-cm/cm) | Defects on Surface of Molded Plate |
|---|---|---|---|---|---|---|---|---|
| | Cylinder Temperature (°C.) | Mold Temperature (°C.) | | | | | | |
| Example 2 | 235 | 50 | 99.1 | 1.9 | 92.3 | 3.6 | 5.2 | None |
| | 245 | 60 | 99.5 | 1.7 | 92.1 | — | 5.1 | None |
| | 255 | 70 | 99.8 | 1.7 | 92.3 | — | 4.8 | None |
| Example 3 | 235 | 50 | 99.6 | 1.7 | | 3.8 | 5.1 | None |
| | 245 | 60 | 99.8 | 1.7 | | — | 5.1 | None |
| | 255 | 70 | 99.8 | 1.5 | | — | 5.0 | None |
| Example 4 | 235 | 50 | 99.0 | 2.1 | 92.1 | 3.2 | 4.7 | None |
| | 245 | 60 | 99.2 | 1.9 | 92.1 | — | 4.5 | None |
| | 255 | 70 | 99.5 | 1.9 | 92.3 | — | 4.7 | None |
| Example 5 | 235 | 50 | 99.0 | 1.9 | 92.2 | 5.8 | 4.9 | None |
| | 245 | 60 | 99.6 | 1.7 | 92.2 | — | 4.8 | None |
| | 255 | 70 | 99.9 | 1.6 | 92.1 | — | 4.8 | None |
| Comparative Example 1 | 235 | 50 | 82.4 | 2.6 | 92.0 | 4.7 | 2.2 | Flow Marks |
| | 245 | 60 | 85.5 | 2.4 | 91.5 | — | 2.4 | Flow Marks |
| | 255 | 70 | 88.9 | 2.2 | 91.9 | — | 2.1 | None |
| Comparative Example 2 | 235 | 50 | 84.4 | 3.1 | 91.9 | 1.6 | 3.7 | Flow Marks |
| | 245 | 60 | 85.5 | 2.4 | 91.8 | — | 3.4 | Flow Marks |
| | 255 | 70 | 97.2 | 1.9 | 92.1 | — | 3.1 | None |
| Acrypet VH (Comparison) | 235 | 50 | 99.8 | 0.9 | 93.2 | 5.1 | 1.4 | None |
| | 245 | 60 | 100 | 0.9 | 93.5 | — | 1.5 | None |
| | 255 | 70 | 100 | 0.9 | 93.5 | — | 1.4 | None |

Note
[*1] through [*5]: The same as described above.

As is seen from the results shown in Table 3, if diallyl phthalate (DAP), diallyl isophthalate (MDAP) or diallyl terephthalate (DATP) is used in preparing an acrylic elastomer [I] by polymerization according to the present invention, the dependency of the surface gloss or surface appearance on the molding conditions is reduced, and an impact-resistant methacrylic resin having characteristic properties quite similar to the inherent characteristic properties of a methacrylic resin can be obtained.

EXAMPLES 6 AND 7 AND COMPARATIVE EXAMPLES 3 THROUGH 6

A graft copolymer [II] was prepared in the same manner as in Examples 2 through 5 except that the monomeric composition shown in Table 2 was changed as shown in Table 4. The obtained test pieces were evaluated in the same manner as in Examples 2 through 5. The obtained results are shown in Table 5.

TABLE 4

| | Monomeric Composition (%) of Acrylic Elastomer [I] | | | | |
|---|---|---|---|---|---|
| | BA | ST | MDAP | DAP | BDMA |
| Example 6 | 80 | 18.0 | 1.5 | 0.5 | — |
| Example 7 | 80 | 18.0 | 1.5 | 0.3 | 0.2 |
| Comparative Example 3 | 80 | 20.0 | — | — | — |
| Comparative Example 4 | 70.5 | 14.5 | 15 | — | — |
| Comparative Example 5 | 80 | 19.95 | 0.05 | — | — |
| Comparative Example 6 | 95 | 3.5 | 1.5 | — | — |

TABLE 5

| | Molding Conditions | | Gloss (%)*1 (incident angle of 60°) | Haze*2 (%) | Total Luminous Transmittance*3 (%) | Melt Flow Index*4 (g/10 min) (230° C. × 10 kg) | Izod Impact Strength*5 (kg-cm/cm) | Appearance Defects on Surface of Molded Plate |
|---|---|---|---|---|---|---|---|---|
| | Cylinder Temperature (°C.) | Mold Temperature (°C.) | | | | | | |
| Example 6 | 235 | 50 | 99.0 | 1.9 | 92.0 | 3.2 | 5.0 | None |
| | 245 | 60 | 99.1 | 1.7 | 92.3 | — | 5.1 | None |
| | 255 | 70 | 99.5 | 1.7 | 92.3 | — | 5.4 | None |
| Example 7 | 235 | 50 | 99.4 | 1.8 | 92.1 | 3.9 | 5.3 | None |
| | 245 | 60 | 99.3 | 1.8 | 92.1 | — | 5.0 | None |
| | 255 | 70 | 99.8 | 1.7 | 92.2 | — | 5.1 | None |
| Comparative Example 3 | 235 | 50 | 52.4 | 19.4 | 82.4 | 7.4 | 1.5 | Entirely Delustered |
| | 245 | 60 | 60.2 | 17.2 | 84.6 | — | 1.7 | Entirely Delustered |
| | 255 | 70 | 61.3 | 17.0 | 88.2 | — | 1.5 | Entirely Delustered |
| Comparative Example 4 | 235 | 50 | 68.4 | 12.8 | 85.4 | 0.95 | 1.5 | Frosted Glass-like Stripe Flow Marks |
| | 245 | 60 | 69.5 | 11.0 | 86.2 | — | 1.3 | Frosted Glass-like Stripe Flow Marks |
| | 255 | 70 | 69.5 | 10.9 | 88.0 | — | 1.4 | Frosted Glass-like Stripe Flow Marks |
| Comparative Example 5 | 235 | 50 | 59.5 | 16.8 | 86.2 | 6.6 | 1.7 | Entirely Delustered |
| | 245 | 60 | 61.2 | 14.2 | 87.6 | — | 1.9 | Entirely Delustered |
| | 255 | 70 | 63.5 | 12.0 | 87.4 | — | 1.9 | Entirely Delustered |
| Comparative Example 6 | 235 | 50 | 82.6 | 39.2 | 54.1 | 2.6 | 5.6 | White and Opaque |
| | 245 | 60 | 84.3 | 39.0 | 50.2 | — | 5.4 | White and Opaque |
| | 255 | 70 | 84.1 | 38.0 | 48.6 | — | 5.4 | White and Opaque |

Note
*1 through *5: The same as described above.

As seen from the results shown in Table 5, the intended object of the present invention cannot be attained if, in preparing an acrylic elastomer [I] by polymerization, the compound used in the present invention such as diallyl phthalate, diallyl isophthalate or diallyl terephthalate is not added at all (as in Comparative Example 3), this compound is added in an amount outside the range specified in the present invention (as in Comparative Examples 4 and 5) or the composition of the monomers for the acrylic elastomer [I] is outside the range specified in the present invention even when the above compound is added (as in Comparative Example 6).

We claim:

1. An impact-resistant methacrylic resin composition which comprises a graft copolymer (II) obtained by polymerizing 10 to 900 parts by weight of a monomer or monomeric mixture (B) comprising 80 to 100% by weight of methyl methacrylate and 20 to 0% by weight of at least one vinyl or vinylidene monomer copolymerizable therewith in the presence of 100 parts by weight of an acrylic elastomer (I) obtained by polymerizing a monomeric mixture (A) comprising 9.9 to 29.9% by weight of at least one monomer selected from the group consisting of styrene and derivatives thereof, 70 to 90% by weight of at least one alkyl ester of acrylic acid having an alkyl group having 2 to 8 carbon atoms, 0.1 to 5% by weight of at least one monomer selected from the group consisting of diallyl isophthalate and diallyl terephthalate, and 0 to 5% by weight of a crosslinkable monomer other than diallyl isophthalate or diallyl terephthalate which is copolymerizable with the foregoing monomers and which has at least 2 carbon-to-carbon double bonds.

2. An impact-resistant methacrylic resin composition according to claim 1, wherein the acrylic elastomer [I] is in the form of particles having a size of 0.03 to 0.25 μm.

3. An impact-resistant methacrylic resin composition according to claim 1, wherein the vinyl monomer used for the graft copolymer [II] is selected from the group consisting of alkyl acrylates having an alkyl group of 1 to 8 carbon atoms, styrene, acrylonitrile and methacrylic acid.

4. An impact-resistant methacrylic resin composition according to claim 1, wherein said crosslinkable monomer is selected from the group consisting of ethylene glycol diacrylate, ethylene glycol dimethacrylate, 1,3-butylene diacrylate, 1,3-butylene dimethacrylate, 1,4-butanediol diacrylate, 1,4-butanediol dimethacrylate, tetraethylene glycol diacrylate, tetraethylene glycol dimethacrylate and divinylbenzene.

5. An impact-resistant methacrylic resin composition which comprises:

(i) a graft copolymer (II) obtained by polymerizing 10 to 900 parts by weight of a monomer of monomeric mixture (B) comprising 80 to 100% by weight of methyl methacrylate and 20 to 0% weight of as least one vinyl or vinylidene monomer copolymerizable therewith in the presence 100 parts by weight of an acrylic elastomer (I) obtained by polymerizing a monomeric mixture (A) comprising 9.9 to 29.9% by weight of at least one monomer selected from the group consisting of styrene and derivatives thereof, 70 to 90% by weight of at least one alkyl ester of acrylic acid having an alkyl group having 2 to 8 carbon atoms, 0.1 to 5% by weight of at least one monomer selected from the group consisting of diallyl isophthalate and dially terephthalate, and 0 to 5% by weight of a crosslinkable monomer other than diallyl isophthalate or diallyl terephthalate which is copolymerizable with the foregoing monomers and which has at least 2 carbon-to-carbon double bonds, and (ii) a methacrylic resin (III) obtained by polymerizing a monomer or monomeric mixture (C) comprising 80 to 100% by weight of methyl methacrylate and 20 to 0% by weight of at least one vinyl or vinylidene monomer copolymerizable therewith;

the amount of the graft copolymer (II) being such that the proportion of the acrylic elastomer (I) in the graft copolymer (II) to the total of the graph copolymer (II) and the methacrylic resin (III) is in the range of 0.5 to 70% by weight.

6. An impact-resistant methacrylic resin composition according to claim 5, wherein the acrylic elastomer [I] is in the form of particles having a size of 0.03 to 0.25 µm.

7. An impact-resistant methacrylic resin composition according to claim 5, wherein the vinyl monomer used for the graft copolymer [II] is selected from the group consisting of alkyl acrylates having an alkyl group of 1 to 8 carbon atoms, styrene, acrylonitrile and methacrylic acid.

8. An impact-resistant methacrylic resin composition according to claim 5, wherein said crosslinkable monomer is selected from the group consisting of ethylene glycol diacrylate, ethylene glycol dimethacrylate, 1,3-butylene diacrylate, 1,3-butylene dimethacrylate, 1,4-butanediol diacrylate, 1,4-butanediol dimethacrylate, tetraethylene glycol diacrylate, tetraethylene glycol dimethacrylate and divinylbenzene.

9. An impact-resistant methacrylic resin composition according to claim 5, wherein said vinyl or vinylidene monomer used for the methacrylic resin [III] is at least one monomer selected from the group consisting of alkyl acrylates having an alkyl group having 1 to 8 carbon atoms, styrene, acrylonitrile and methacrylic acid.

* * * * *